June 10, 1930.  J. F. O'CONNOR  1,762,411
JOURNAL BEARING
Filed Sept. 28, 1927
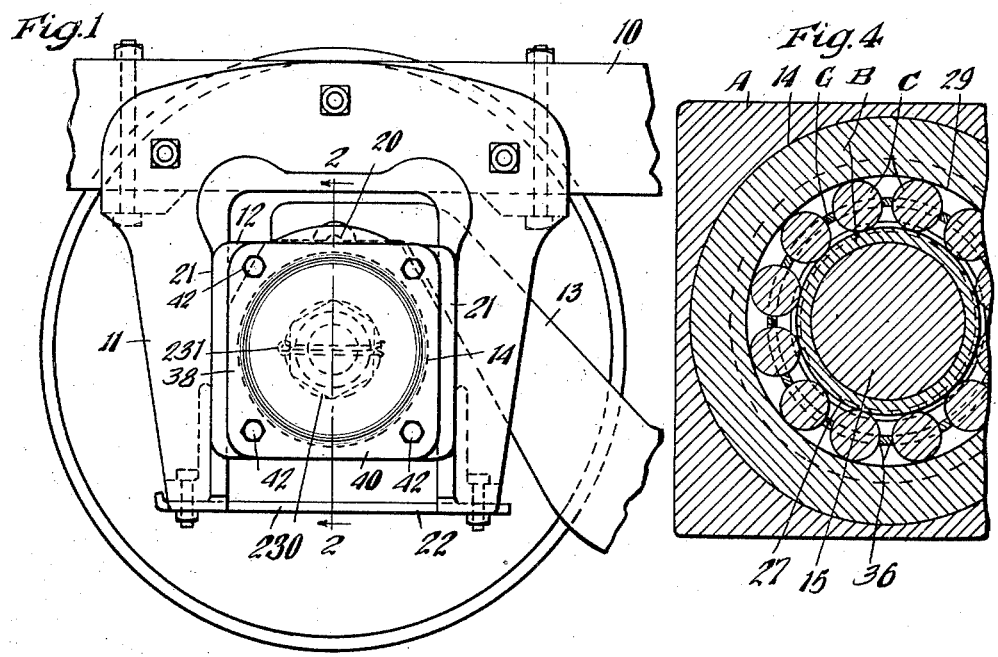
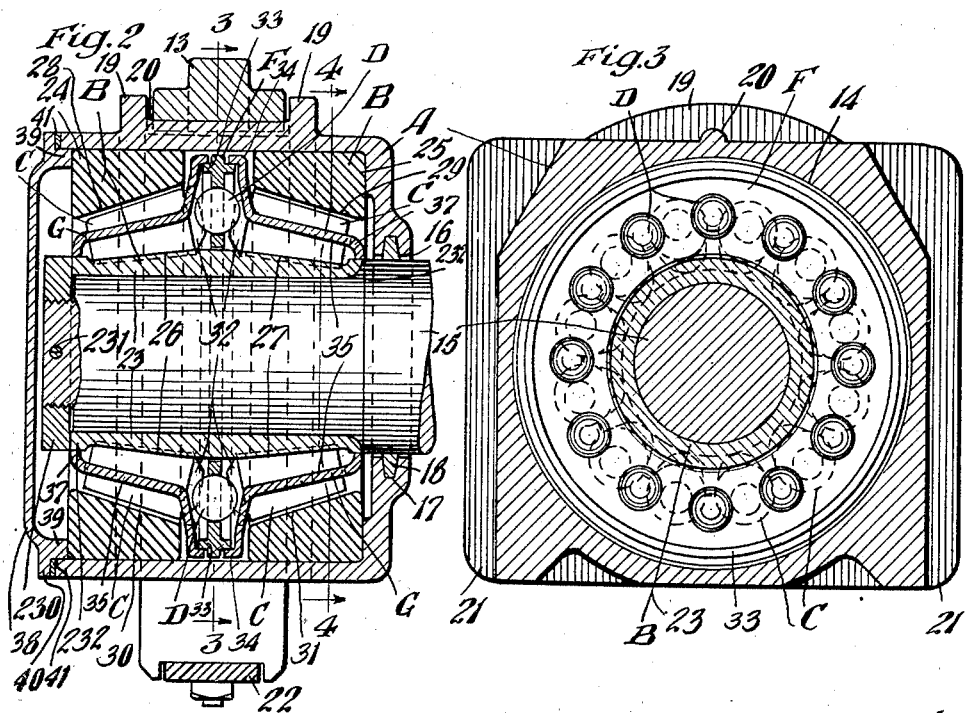
Witness
Wm. Geiger
Inventor
John F. O'Connor
By George L. Haight
His Atty.

Patented June 10, 1930

1,762,411

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

JOURNAL BEARING

Application filed September 28, 1927. Serial No. 222,415.

This invention relates to improvements in journal bearings.

An object of the invention is to provide an anti-friction arrangement, more particularly adapted for use in connection with the journal boxes and journals of railway cars, and wherein race members are provided for the journal and journal box between which are arranged oppositely disposed annular series of cone rollers, the adjacent inner ends of which are of frusto-conical formation, and bear upon an annular series of balls so arranged with reference to the inner ends of the rollers as to maintain said ends in alignment and to provide an anti-friction bearing therefor, in conjunction with retainers for maintaining said balls and said rollers in proper position.

Other and further objects of the invention will more fully and clearly appear from the description and claims hereinafter following.

In the drawings forming a part of this specification, Figure 1 is a side elevational view of a fragment of a railway car truck, showing a truck pedestal member and a journal box embodying the invention, mounted in said pedestal member. Figure 2 is a transverse vertical sectional view corresponding substantially to the line 2—2 of Figure 1. Figure 3 is a vertical sectional view corresponding substantially to the line 3—3 of Figure 2. And Figure 4 is a sectional view corresponding substantially to the line 4—4 of Figure 2.

As shown in the drawing, 10 represents a fragment of the body portion of a car truck, and 11 represents a common type of pedestal member mounted thereon, having the usual spaced jaws between which is slidably disposed a journal box 12 embodying the invention. The numeral 13 indicates one end of an equalizer bar which bears upon the top of the journal box 12 and transmits the load from the frame of the truck to the top of the journal box, the latter in turn transmitting the load through the anti-friction bearings to the journal. The invention broadly contemplates the provision of a journal box A, journal and journal box race members B, conical rollers C, anti-friction aligning means D, ball retainer F, and roller retainer G.

The journal box A comprises side, top, bottom and rear walls, and is of hollow construction, having a centrally disposed annular recess 14 into which the journal 15 projects. The journal 15 is admitted into the recess 14 through an aperture 16 in the rear wall of the journal box, and the edge of the rear wall defining the aperture 16 is provided with a groove 17 for the reception of packing material 18. The top wall of the journal box is provided with the usual spaced flanges 19—19, and an equalizer seat 20 for the reception of the grooved end of the equalizer bar 13. The side walls of the journal box A are also provided with spaced flanges indicated at 21—21, said flanges being adapted to fit upon the opposite sides of the pedestal jaws to provide guides in the usual manner, the journal box A being retained in its position between the jaws of the pedestal member by the usual strap 22.

The race members B comprise a sleeve 23 mounted upon the journal, and two spaced rings 24—25 fitted into the annular recess formed in the journal box A. The sleeve is held in position upon the journal 15 by means of a nut 230 threaded upon a reduced portion of said journal and locked in position by means of a cotter pin 231. The sleeve is provided with oppositely inclined bearing surfaces 26 and 27, which are disposed in such relation with the surfaces 28 and 29 of the rings 24 and 25 as to provide cone bearing surfaces which converge outwardly in opposite direction and are adapted to provide a rolling fit for the conical rollers C. The sleeve 23 at its opposite ends is provided with cylindrical portions 232 adapted for co-operation with the roller retainer G as hereinafter described. The conical rollers C are arranged in two annular series, indicated at 30 and 31, the rollers of the annular series 30 being disposed between the bearing surfaces 28 and 26 of the race members B, and the rollers of the annular series 31 being interposed between the bearing surfaces 27 and 29 of the race members.

As best shown in Figure 2, each roller of each of the series 30 and 31 is of frusto conical form, and the inner adjacent ends of each of the rollers of each series is formed with a reduced frusto conical portion 32, the annular series of rollers 30 and 31 being maintained in spaced relation by means of the spacing and aligning balls D.

The balls D are arranged in an annular series, each ball being located between the ends of and contacting with the adjacent ends of pairs of rollers of each series of rollers, so that each ball in conjunction with the adjacent ball, spaces longitudinally of the journal, a pair of rollers of each of the series 30 and 31, and circumferentially spaces the ends of a like number of rollers, each of the balls bearing upon the reduced frusto conical surfaces of four rollers, two of each annular series.

The centers of the balls D are arranged slightly outside of the axial centers of the rollers C, and are maintained in this position by means of the ball retainer ring F. This ring is for the most part flat, and is provided with a central opening of slightly greater diameter than the greatest diameter of the sleeve 23. The retainer F is provided with an annular series of circular openings spaced apart a distance corresponding to the distance between the centers of the balls, and each of said openings is adapted for the reception of one of the balls, and due to the fact that the centers of the balls are located slightly outside of the axial centers of the rollers, said balls serve to support the ring or retainer F clear of the sleeve 23 so that the ring or retainer is carried by said balls. Adjacent the circumferential periphery of the retainer F are laterally extending flanges 33 which co-operate with the roller retainers G.

The roller retainers G are two in number, one for each of the series 31 and 32 of the rollers. Each retainer is provided with a flanged portion 34 which bears upon the adjacent flange 33 on the ball retainer F, and is further provided with a body portion 35 tapered to conform to the arrangement of the rollers, and provided with a series of elongated tapered openings indicated at 36, each of which is adapted for the reception of one of the rollers C. The outer end of the retainer G is provided with a flange 37 which bears upon the cylindrical portion 232 of the sleeve 23. The retainers G are of exactly the same character except for their opposite disposition, and the same reference characters will be utilized to designate like parts of both.

Means are provided for adjusting the bearing through axial movement of the race ring 24. This is accomplished through the medium of the cover 38 which has a flanged portion 39 bearing upon the ring 24. The cover 38 is also provided with a flange 40 which bears upon the journal box, there being a shim or shims, only one of which is indicated at 41, interposed between the flange 40 and the adjacent portions of the journal box, the cover 38 being secured to the journal box by means of bolts 42. When it is desired to adjust the bearing, the cover may be removed, and a shim removed, and when the cover is replaced, the flange 39 bearing upon the race ring 24 moves said ring axially inward until the cover engages the edges of the journal box. The axial inward movement of the race ring 24 carries therewith the rollers of the series 30, said movement being transmitted through the balls D to the rollers of the series 31, bringing about relative movement of the series of rollers 31 with respect to the race ring 25, which latter is held stationary by abutment against the rear wall of the journal box.

By the above described arrangement, it will be appreciated that the annular series of balls interposed between the frusto conical ends of the rollers of the two series of rollers serve to greatly reduce the friction, the balls in operation rotating upon an axis parallel to the axis of the journal, and said balls additionally serve to circumferentially space the rollers of each series, and to longitudinally space the rollers of each series, each ball bearing in its operative engagement upon the ends of two rollers of each series. By reason of the disposition of the balls, the retaining ring is carried thereby, greatly reducing friction, and said ring serves also as a partial support for the roller retainers G which co-operate to maintain the rollers in circumferential and longitudinal alignment.

While I have herein described what I consider the preferred manner of carrying out the invention, the same is merely illustrative and I contemplate all changes and modifications which come within the scope of the claims appended hereto.

I claim:

1. In a structure of the character described, the combination with a journal box member and a journal member; of race members associated with said journal member and said journal box member, said members being formed to provide conical spaced raceways, the defining surfaces of which converge from a central point outwardly; spaced circular series of conical rollers, the inner end of each of the rollers of each series being conically tapered; anti-friction balls interposed between the circular series of rollers, each of said balls bearing upon the adjacent conical tapered ends of four rollers, two rollers of each series, and operating to axially and circumferentially space and align the same; and means for maintaining said balls in operative position.

2. In a structure of the character described, the combination with a journal box member and a journal member; of race members associated with said journal member and said journal box member, said members being formed to provide conical spaced raceways, the defining surfaces of which converge from a central point outwardly; spaced circular series of conical rollers, the inner end of each of the rollers of each series being conically tapered; anti-friction balls interposed between the circular series of rollers, each of said balls bearing upon the adjacent conical ends of two adjacent rollers of each circular series and operating to axially and circumferentially space and align the same; means for maintaining said balls in operative position, said means serving to maintain the center of said balls slightly outside of the axial centers of said rollers, whereby said balls support said retaining means clear of said race members; and retaining members for said rollers, each of said retaining members being provided with apertures for the reception of said rollers, each retaining member being supported in one portion by said retaining means.

3. In a structure of the character described, the combination with a journal box and a journal; of a sleeve mounted on said journal and provided with oppositely disposed conical surfaces tapering in an outward direction from the center of said sleeve; spaced race rings having conical surfaces cooperating with the surfaces of said sleeve to provide raceways converging outwardly; spaced series of conical rollers mounted to operate on the surfaces of said race rings and sleeve, the inner adjacent ends of each series being frusto conical in form; an annular series of balls arranged between the ends of said rollers to space the same axially of the journal and circumferentially thereof; a retaining plate provided with apertures for the reception of said balls to maintain the same in position, the centers of said balls being disposed outside of the axial centers of said rollers whereby said retaining plate is supported by said balls; retaining elements for said rollers, said retaining elements being provided with apertures for the reception of said rollers, said retaining elements bearing partly upon the retaining member supported by said balls; and means for axially moving one of said race rings with reference to the other whereby the rollers associated with said other ring move relatively thereto.

4. In a device of the character described, the combination with a journal box and a journal member; of a race member carried by the journal box; an opposed race member carried by the journal; an annular series of rollers between said race members, each of said rollers having a conical bearing portion at one end, said conical end portions of the series being at the same side of the device; and an annular series of spaced balls alternated with said roller and each engaging the conical end portions of two adjacent rollers of said annular series to hold the same spaced apart.

In witness that I claim the foregoing I have hereunto subscribed my name this 24th day of September, 1927.

JOHN F. O'CONNOR.